United States Patent [19]
Allard et al.

[11] Patent Number: 5,142,165
[45] Date of Patent: Aug. 25, 1992

[54] POWER OFF/ON DELAY CIRCUIT TO PREVENT LOCKOUT

[75] Inventors: David J. Allard, Boynton Beach; Salvatore R. Riggio, Jr., Boca Raton, both of Fla.

[73] Assignee: International Business Machines Corporation, Armonk, N.Y.

[21] Appl. No.: 575,774

[22] Filed: Aug. 31, 1990

[51] Int. Cl.$^5$ .................... H01H 83/12; H02B 3/247
[52] U.S. Cl. .................... 307/130; 323/901; 361/59; 361/89
[58] Field of Search ....... 364/483, 273.4, 948.4–948.7, 364/948.91; 361/59, 60, 71, 75, 86, 89; 307/130, 125; 323/901, 326, 280, 288

[56] References Cited

U.S. PATENT DOCUMENTS

| | | | |
|---|---|---|---|
| 3,772,568 | 11/1973 | Phillips | 361/59 |
| 3,921,058 | 11/1975 | Tanaka | 323/300 |
| 3,940,663 | 2/1976 | Meier | 361/59 |
| 4,234,920 | 11/1980 | Van Ness et al. | 364/200 |
| 4,644,137 | 2/1987 | Asahi | 361/59 |
| 4,771,356 | 9/1988 | Hastings | 361/59 |
| 4,912,591 | 3/1990 | LeCourt | 361/75 |

FOREIGN PATENT DOCUMENTS 56110426 of 0000 Japan .

*Primary Examiner*—A. D. Pellinen
*Assistant Examiner*—Richard Elms
*Attorney, Agent, or Firm*—Robert Lieber; Winfield J. Brown, Jr.

[57] ABSTRACT

The present off/on delay circuit operates within the power supply of a microcomputer system to interrupt transfer of regulated DC voltage to the system microcomputer and attachments in respect to indications of power disturbance and system switch status produced in the supply. Upon termination of such indications, this circuit selectively delays reappearance of regulated DC voltage to the level required for system operation so that whenever the microcomputer resets, the attachments must also reset; thereby preventing lockout impasses in the system rebooting process. The circuit operates in response to a plurality of DC voltage indications in the power supply, including at least an indication distinguishing the state of AC source power as either good or bad, and an indication distinguishing the state of a manually operable system power switch as either on or off. In one embodiment, the delay in reappearance of regulated DC operating voltage is chosen to be either relatively fast or slow depending upon how long the system operating voltage has been deactivated. Thus, the slow delay is chosen so as to effectively lengthen the effects of short duration outages or disturbances sufficiently to preclude lockout.

11 Claims, 5 Drawing Sheets

OFF/ON DELAY CIRCUIT

POWER OFF/ON DELAY CIRCUIT TO PREVENT LOCKOUT

CROSS-REFERENCES TO RELATED PATENT APPLICATIONS

Patent application Ser. No. 07/553,926, by E. A. Lindfors, entitled "Keyboard Anti-Lockout Circuit" and filed Jul. 16, 1990, describes prevention of lockouts between a microcomputer system and an attached keyboard or mouse. After power outage in such systems, the system microprocessor resets explicitly, in response to reset signals generated by the system power supply while the latter unit recycles. However, the power dependent attachments, such as keyboards, reset implicitly, in reaction to their condition of received DC energy. The latter condition is affected by capacitive retention. Thus, when power supply recycling is caused by AC outage or transient operation of a manual on/off switch, the system microprocessor will invariably reset, but, depending on the duration of the power disturbance, there is a small but finite possibility that energy retained in one or more attachments will not dissipate sufficiently to allow the respective attachments to reset. When this occurs, the system microprocessor and affected attachments reach an impasse condition, presently termed a "lockout", in which the system is unable to continue productive processing.

The Lindfors application discloses prevention of keyboard-associated lockouts by insertion of a special anti-lockout delay circuit between the keyboard and the system port through which it receives regulated DC operating voltage. The present invention involves recognition that lockouts may occur between a microcomputer system and attachments other than keyboards (e.g. disk and diskette drive controllers), and seeks to provide a more universal avoidance of lockouts in such systems. This is accomplished presently by modifying the system power supply to include delay circuitry which effectively prevents lockout relative to any attachments.

SUMMARY OF THE INVENTION

In personal computer systems, fluctuations in system power may give rise to conditions requiring resetting of the system and attached devices. Such resetting functions are usually carried out automatically in response to conditions separately sensed by the system microprocessor and attachments. Typically, the system microprocessor is reset by an explicit "reset" signal, generated by the system power supply when the latter recycles, while the power-dependent attachments (keyboard, mouse, disk/diskette drive controllers, etc.) reset as a function of their states of energization; which depend on DC energy instantly being received from the supply and energy capacitively retained after power drops.

Thus, when power is recycled after a short duration power disturbance, the system microprocessor will invariably be reset but attachments may or may not be reset depending upon their impedance characteristics. Such occurrences, in which the system microprocessor resets and an attachment does not, result in processing impasses presently termed lockouts. More specifically, lockouts occur when the system microprocessor when the system resets, and in the rebooting process fails to receive an expected response from an interrogated attachment due to the latter having failed to reset.

Furthermore, power supplies in contemporary systems have "power holdup" features such that they can continue operating without recycling when disturbances of source AC are very short (typically, less than 0.1 second in duration). In systems having such supplies, power is not recycled after disturbances falling in the lockout range, and therefore the system is not reset after such disturbances.

System resets significantly degrade system productivity, inasmuch as each reset effectively wipes out data and programs stored in volatile memory and therefore effectively aborts any application in process prior to the reset. Thus, it is desirable to avoid unnecessary resets. Furthermore, each lockout event is even more debilitating than a simple reset, since it usually requires operation of a power control switch by human intervention; and such switch operation may be unavailable in any reasonable time for systems running unattended (e.g. network servers operating at night, etc.).

U.S. Pat. No. 4,771,356 granted Sep. 13, 1988 to S. D. Hastings, discloses the concept of preventing occurrence of microcomputer "lockup" conditions after very short duration power outages. The circuit disclosed in this patent directly monitors AC line voltage, and, upon sensing disturbance of even a half AC cycle duration (about 0.008 seconds) opens a switch in the AC transfer path. The switch is thereafter held open for the duration of the disturbance, and for several seconds thereafter, and then reclosed to repower the system. The additional several seconds delay effectively serves to prevent lockup of the system microprocessor (which is not a problem relative to present systems in which the microprocessor is explicitly reset during recycling of the system power supply).

A disadvantage of this AC switching techique is that it may introduce unnecessary power recyclings; particularly relative to systems whose power supplies would be insensitive to AC disturbances lasting for much longer than a half cycle of AC variation (i.e. 0.008 seconds). As indicated previously, each power recycling can significantly degrade system productivity, and therefore each unnecessary recycling is undesirable.

Another disadvantage of this AC switching technique is that the circuits used to detect AC disturbance require a DC power supply separate from that of the microcomputer system they are supposed to protect (since they are necessarily positioned between the AC line and system). This additional power supply adds to the system cost.

Another disadvantage of the Hastings technique is that the delay circuits thereof are insensitive to the state of any system on/off switch which can be manually operated, and thereby does not eliminate potential human factor problems. Thus, it is possible for the Hastings circuit to switch off AC source energy, upon detecting AC disturbance, while an attendant, sensing that system power is off, attempts to manually operate the system power control switch off and on. In this circumstance, depending upon the length of the disturbance, it is possible that AC power could still be off when the system power control switch is turned on manually, and this could prompt an attendant to repeat the off/on switch operation. This of course could effectively increase the delay in eventual restoration of system operation, and thereby further degrade system productivity.

The present invention provides improved circuit means for preventing lockouts in microcomputer systems, while avoiding unnecessary interruptions of system power as well as unnecessary recovery delays after such interruptions. Furthermore, the present circuit means is more economical than that of Hastings in that it does not require a power supply separate from the system power supply for sustaining its operations. As suggested by the last statement, this circuit means is integrated into the microcomputer system power supply and is adapted to avoid interruptions of (DC) supply voltage to the system microcomputer and attachments which are rendered unnecessary by any characteristic of the respective supply, such as the holdup time factor mentioned earlier.

Accordingly, an object of the present invention is to provide an improved delay circuit for preventing lockouts in microcomputer systems, while avoiding unnecessary interruptions of power relative to such systems.

Another object is to provide such improved circuit means integrated within the system power supply, and powered by DC voltage produced in said supply.

Another object is to provide improved delay circuitry for lockout prevention, which is integrated into the system power supply, and operative in response to at least one DC condition indication produced in the supply for controlling recycling of the respective power supply, and for selectively delaying restoration of power for an additional delay period of several seconds after termination of the condition giving rise to the recycling action when the duration of that condition is less than the time of such additional delay period but not when the condition duration is longer than that period.

A related object is to provide improved delay circuitry as just stated, wherein the change in said at least one condition indication which causes said circuitry to control power recycling is tailored to operating characteristics of the power supply in which the circuitry resides, whereby said circuitry avoids instigating unnecessary recyclings and system resets.

Another object is to provide improved delay circuitry for lockout prevention which upon detecting a condition requiring power recycling produces control signals which cause the supply to effectively turn off for the duration of the detected condition and then recycle to stable operating state, and which selectively adds a delay of several seconds to its issuance of the signal enabling the supply to begin recycling when the duration of the detected condition is less than the time of such added delay.

A related object is to provide such delay circuitry in which a plurality of DC condition indications are monitored, including at least a first DC voltage distinguishing the state of AC source energy as "OK" or "NOT OK" in relation to the effect of any disturbance thereof on the condition of operation of the supply, and at least a second DC voltage distinguishing the condition of a manually operable control switch as either "ON" or "OFF", and in which issuance of a control signal to recycle the supply is conditioned at least in part on said first and second DC voltages being coincidentally at predetermined voltage levels effectively representing that AC source energy is OK and the manual switch position is ON.

These objects are realized by providing circuits within a system power supply for monitoring a plurality of DC voltage indications within the supply, and for effectively causing the supply to shut down, when any monitored indication varies by a predetermined amount representing a disturbance requiring power recycling, and thereafter causes the supply to recycle when the changed monitored indication returns to a condition indicating termination of the disturbance. These circuits act selectively to add an additional delay of several seconds in respect to starting recycling when the duration of variation in the monitored indication is less than the time of such added delay. As this suggests, the present circuit monitors condition indications indicating power disturbances requiring recycling, as opposed for example to AC outages of shorter duration than the supply holdup factor, and initiates controlling action when such disturbances are detected. The controlling action effectively disables the supply for the duration of the disturbance, and thereafter re-enables the supply for power up recycling. The present circuit includes an added delay feature, by which it conditionally delays the action which re-enables the supply for several seconds (typically, 4 seconds) after disturbances lasting for less than the added delay time.

Thus, after the end of a disabling disturbance, re-enabling action is started either instantly or after the added delay time, depending upon the duration of the disturbance. Accordingly, the shortest disablement of the power supply when recycling is required is the added delay time, and the disablement is not prolonged when the disturbance is longer than this shortest time. In effect, this ensures that when the system microprocessor is reset, any operating voltage indications capacitively stored in the system attachments will have had sufficient time to decay to levels at which such attachments (regardless of type, origin, etc.) are unambiguously reset, while minimizing interference with supply/system operation relative to longer disturbances.

A feature of the present delay circuit means is that it operates in response to plural DC voltage indications in the respective power supply to determine if added delay is needed. One such indication effectively distinguishes between "OK" and "NOT OK" states of AC source energy, relative to recycling requirements of the power supply (taking into account the holdup factor, etc.), and another such indication effectively distinguishes "OFF" and "ON" states of a manual power control switch, typically located on the system housing. Thus, supply disablement and recycling is instigated only when states of these indications (one or both) change from "normal" operating levels (OK and ON) to reverse levels (NOT OK or OFF), and such disablements are prolonged by added delay only when these reverse indications persist for longer than the time duration of the added delay.

A feature of one embodiment of the present invention is the provision therein of comparatively fast and slow voltage charging paths, to allow for either slow or fast development of the operating voltage to be transferred to the system, depending upon the length of the disturbance. If the disturbance lasts for longer than the time associated with possibility of lockout in any attachment, when it ends the fast charging path is selected and this causes fast development of the signal for initiating power recycling and re-enablement. If the disturbance is shorter than that time, the slow charging path is selected so as to delay development of the initiating signal.

DETAILED DESCRIPTION

Figure 1:
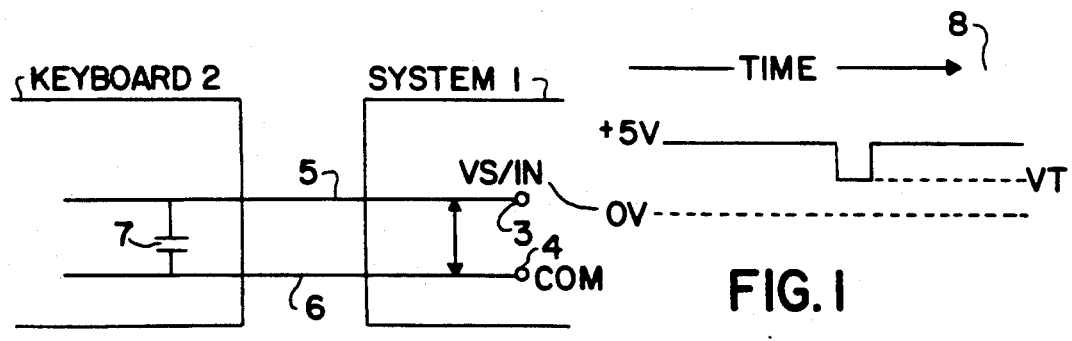
FIGS. 1 and 2 schematically illustrate the lockout problem addressed by the present invention.

Referring to FIG. 1, system 1 and its power-dependent attachments/devices, one of which is a keyboard shown at 2, are ordinarily directly interconnected for transfer of DC supply voltage from the system power supply (not shown here) to the devices and for bidirectional exchange of information/logic signals between the system and devices. DC supply voltage ports 3 and 4 on the system side extend via respective leads 5 and 6 to corresponding unnumbered voltage ports on the device side. Leads 5 and 6 transfer DC supply voltage VS/IN to the device/keyboard; the polarity of voltage on lead 5 being referenced to a common potential on lead 6. VS/IN is developed within a not-shown system power supply from e.g. AC utility power (also called "source AC energy" herein). That power supply may be housed within the system enclosure and if convenient mounted on the system "mother"/planar integrated circuit board.

Other device attachments to which the presently discussed lockout problem will apply include system disk drive and diskette drive controllers, internal modems, etc.

Other not-shown leads carry information signals bidirectionally between the system and keyboard. Capacitance 7 schematically represents the capacitive component of the internal impedance of the device/keyboard relative to the DC supply voltage energy received from the system port. In general, it should be understood that the device does not receive an explicit reset signal from the system, and therefore it resets only in response to internal conditions associated with the energy instantly appearing at the system supply voltage port and remnants of any previously transferred energy stored by capacitance 7.

A point to note here is that conditions determining establishment of reset states in the attachments do not instantly track states of operation of the system power supply, whereas the not-shown system microprocessor which directs operations of the rest of the system is reset explicitly by a signal from the power supply when the latter recycles. Thus, as the power supply recycles after disturbance of its AC source energy, or after operation of the manual control switch from OFF to ON position, the system microprocessor is invariably reset while states of the attachments (reset or not reset) depend on how much energy internally stored in the attachments has decayed when the system microprocessor is reset; i.e. upon individual attachment characteristics and the duration of the power interruption.

As shown at 8, DC supply voltage VS/IN at system power supply port 3 is regulated to stabilize at some nominal level (about +5 volts in the illustrated keyboard supply path) relative to common potential at port 4. VS/IN is generated by the not-shown system power supply. VT represents a threshold voltage level relative to which the attachment will reset, if VS/IN remains below that level for a sufficient length of time. In presently considered power supplies, so long as VS remains in a regulation range above VT power supply operations are unaffected and the system continues operating normally. When AC disturbance or other transient condition is of sufficient duration and/or magnitude the power supply recycles. During recycling, the supply outputs are disabled, and subsequently re-enabled after the disturbance or transient has ended. During the re-enablement, and after DC output voltages have stabilized at levels suitable for system operation, the power supply generates a reset signal which causes the system microprocessor to reset and then reboot.

As explained earlier, lockouts occur when the system microprocessor receives an erroneous response from an attachment which has failed to reset during the rebooting process following a microprocessor reset. At such times, the system microprocessor posts an error indication and transfers to a stopped state. Since the microprocessor cannot exit from that state without operation of the attachments, and since the system cannot do useful processing while the microprocessor is in that state, the system is in an impasse or lockout condition.

Figure 2:
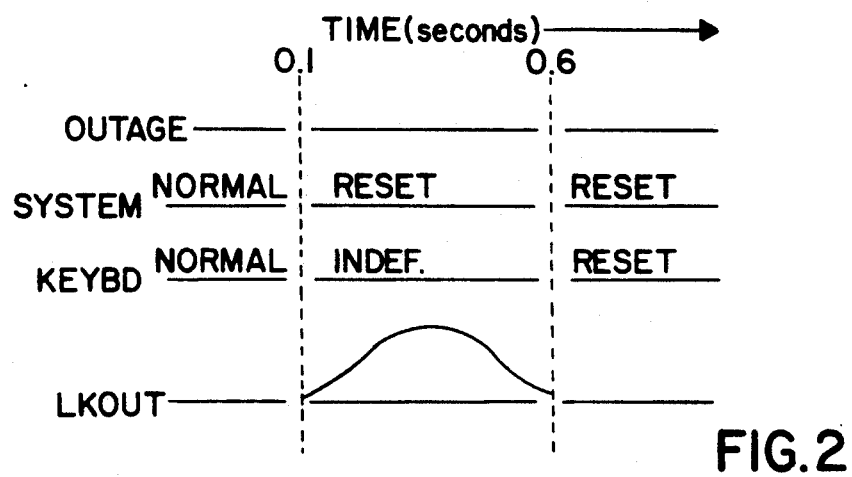

FIG. 2 illustrates relationships between power interruptions of various durations and system (microprocessor) and keyboard operating states (reset and "normal" or not reset). Similar relations with different time parameters apply to other devices. It is assumed here that the system power supply has a "holdup" feature enabling it to "ride through" outages of source AC energy lasting for a few cycles of AC variation; a holdup time of about 6 AC cycles or about 0.1 seconds is considered typical. Thus, for AC outages lasting less than about 0.1 seconds, the DC voltage outputs of the power supply remain within acceptable operating ranges and the system and attachments continue operating without change.

After outages longer than about 0.6 seconds, the system microprocessor and keyboard unambiguously reset (0 lockout probability), so that when the system reboots lockout will not occur. Thus, the system is able to resume productive processing after rebooting, although it is of course understood that there is a not insignificant hiatus in processing when this occurs (since the application in process is aborted when the power supply is disabled and data in system volatile memory is effectively discarded). An explanation for the 0 probability of lockout here is that 0.6 seconds is a time sufficient to allow DC energy capacitively retained in the keyboard (time periods may be different for other attachments) to decay below levels which cause respective units to reset.

In the range between 0.1 and 0.6 seconds, there is finite possibility of lockout. After power disturbances in this range, the system microprocessor resets explicitly, in response to the reset signal produced by the recycling power supply, and the attachments are either reset or not reset depending upon retained levels of energy. As explained earlier, if the keyboard (or other attachment)

fails to reset, lockout will occur (i.e. the system microprocessor will post an error indication while rebooting, and transfer to a stopped state preventing any further useful operation including communication through the keyboard).

Summarizing the illustrations of FIG. 2, probability of keyboard related lockout is non-zero after disturbances lasting between 0.1 and 0.6 seconds, and virtually zero outside of that range. All attachments have such lockout possibility ranges, although with different time limits. Of course, the narrower the range of lockout possibility, the less likely the probability and frequency of lockout occurrence.

Figure 3:
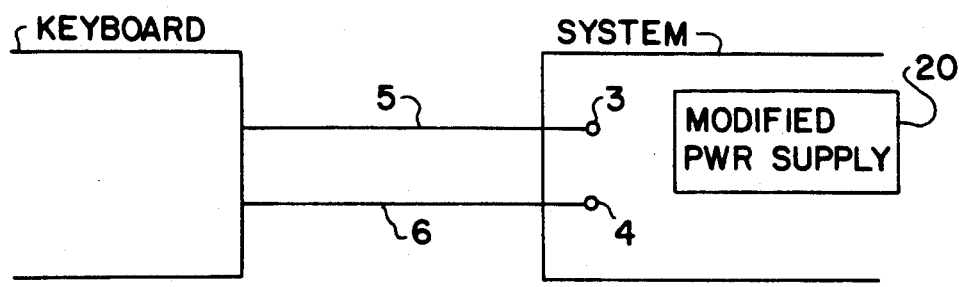
FIG. 3 schematically illustrates the approach taken presently to solve the problem.
Figure 4:
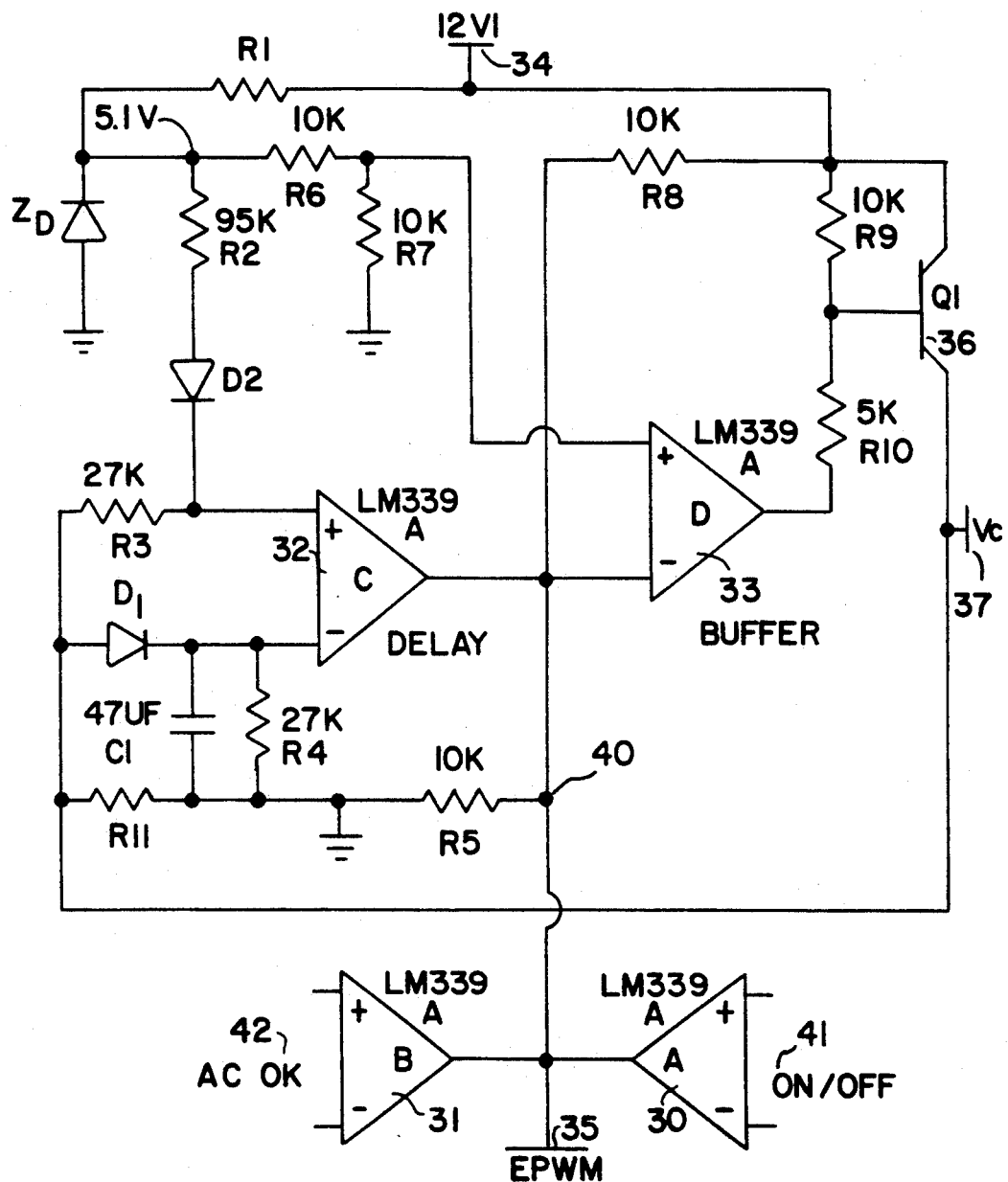
FIGS. 4 and 5 illustrate preferred embodiments of on/off power supply delay circuits constructed in accordance with the present invention.
Figure 5:
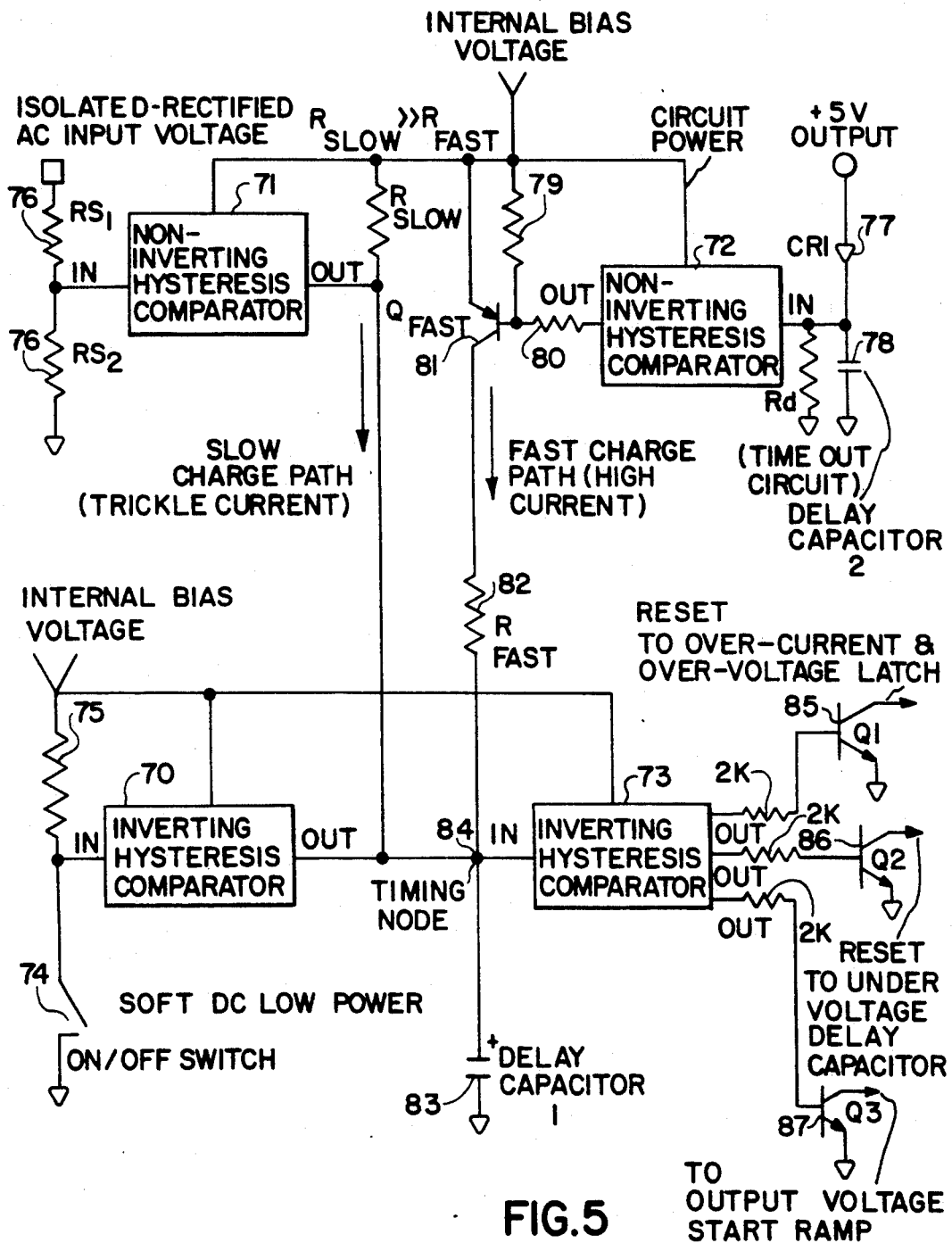

Although lockout occurrences in existing systems are infrequent, and manual recovery is simple (by turning the system power switch off and then back on), such action may be unfeasible or inconvenient in unattended systems; e.g. those connected to networks operating at night. Accordingly, it is desired to prevent lockouts with as little disruption of system productivity as possible. The alternative offered by the present invention is to prevent lockouts in such systems by adding conditionally activated delay circuitry to existing or conventional power supplies, as suggested in FIG. 3. Preferred embodiments of such delay circuitry are illustrated in FIGS. 4 and 5. Operations of the circuit of FIG. 4 relative to power interruptions of various durations are explained with reference to FIG. 6, and operations of the circuit of FIG. 5 relative to similar ranges of power interruption duration are explained with reference to FIGS. 7 and 8 (FIG. 7 relative to manual switch interruptions and FIG. 8 relative to AC outage interruptions).

Such delay circuitry controls disablement and re-enablement of power supply outputs to the system microprocessor and attachments in response to variations in supply operating conditions, and conditionally adds a time delay before re-enablement. The added delay is introduced when the condition giving rise to interruption of normal supply operation terminates within a predetermined time range (between 0.1 and 4 seconds presently relative to AC outages and between 0 and 4 seconds relative to manual switch operations). The added delay serves to ensure that energy stored in system attachments has decayed to a level sufficiently low to ensure that all attachments are reset when power is restored.

The delay circuit embodiment shown in FIG. 4 comprises comparator circuits 30-33, and other circuits described below, operating between internal terminals 34 and 35 of a not-shown otherwise conventional system power supply. When source AC is stable, a predetermined regulated level of DC internal bias voltage VI (about 12 volts DC in the illustrated configuration) is established at internal terminal 34. The illustrated circuits generate a variable voltage EPWM (abbreviation for "Enable Pulse Width Modulation") at terminal 35. The latter voltage is buffered through comparator 33 and transistor Q1 to provide a low impedance source of corresponding control voltage signals Vc which directly control operations of not-shown pulse width modulator and other conventional circuit elements of the power supply. Vc thereby controls the DC outputs presented to the system microprocessor and attachments (including the reset signal explicitly coupled to the system microprocessor).

The comparators are each powered by a not-shown DC bias voltage from the power supply, which may be either the voltage present at internal terminal 34 or a corresponding voltage produced within the power supply. Desirably, the input to terminal 34 from the power supply should have low noise susceptibility (e.g. ripple less than ½ volt).

During stable power supply operation, a predetermined regulated level of internal bias voltage (VI) is maintained at terminal 34, about 12 volts DC in the illustration. Inputs to comparators 30-32 are such that all outputs are high, allowing EPWM to be stable at about 6 volts (12 VI dropped by the resistor divider formed by R8 and R5). Signal Vc, derived from EPWM, is used to control the conventional output regulating elements of the supply, such as the not-shown pulse width modulator circuit which is conventionally included in the supply, and thereby controls enablement and disablement of the supply output ports through which the system and attachments are energized.

When EPWM is higher than the reference voltage applied to the "+"input of comparator 33, output of that comparator is relatively low and current drawn through the divider formed by resistors R9 and R10 causes Q1 to conduct, pulling Vc up to the level of VI. When EPWM is low relative to the + input of comparator 33, output of the comparator is high preventing conduction of Q1. When Q1 is not conducting, Vc is pulled to ground through resistor R11. Thus, Vc is enabling or high, relative to the power supply circuits which it controls, when EPWM is relatively high (relative to the + input of 33) and disabling or low when EPWM is relatively low.

The reference voltage at the + terminal of comparator 33, about 2.6 volts in the illustrated configuration, is derived from the reference at Zd, (formed by Zd, R1 and VI) divided down by R6 and R7. The large difference between this reference voltage and the maximum positive level of EPWM (6 Volts DC) serves to provide a measure of noise immunity in operations of comparator 33.

When Vc is high, operation of the power supply is fully enabled and supply voltages required for operating the system and attachments are applied to not-shown output ports of the power supply. When Vc is low, operation of the supply is disabled and outputs of operating supply voltages are inhibited. After operating supply output voltages stabilize, following a high-to-low-to-high transition in Vc, not-shown power supply circuits which supply reset signals to the system microprocessor are controlled to generate a reset signal. That signal is applied through a not-shown output port of the supply to the system microprocessor but not the attachments, and explicitly causes the system microprocessor to reset itself and start rebooting the system.

Comparators 30-33 are parts of a single LM339 chip with open collector outputs. Outputs of comparators 30-32 (hereafter, also called comparators A, B and C) are tied together at 40 so that conditions of operation of these comparators act as a logical AND function to determine the voltage level of EPWM. When internal bias voltage VI is stable at the level associated with stable supply operation (12 volts), and inputs to comparators A and B are "enabling" (AC in "OK" condition and manual switch in "ON" condition), EPWM is positive relative to the voltage applied to the reference input of comparator 33, driving output of (inverting) comparator 33 low. This conditions Q1 to conduct, driving Vc high and thereby allowing outputs of the supply to rise to levels required for system operation.

Inputs to comparator A at 41, developed from not-shown circuits within the power supply, form a polarized "ON/OFF" signal (with assumed hysteresis correction) representing conditions of operation of a not-shown manually operable power control switch located typically on the outside of the system housing enclosure. This switch controls transfer of power supply voltages to the supply outputs but need not directly interrupt delivery of AC energy to the supply. When inputs to comparator A are in the condition indicating operation of the switch to its OFF position, output of that comparator (i.e. EPWM) is held low. As a result, output of comparator 33 is held high preventing Q1 from conducting, and therefore Vc is held low or in disabling condition.

Inputs to comparator B at 42, developed from not-shown (rectification and filtering) circuits within the power supply, form a polarized "OK/NOT OK" signal indicating the state of source AC energy received by the supply. When these inputs are in the condition denoting AC NOT OK, comparator B output is held low, and therefore EPWM and Vc are low or disabling.

Thus, if either an OFF indication is present at comparator A input or an AC NOT OK indication is present at comparator B input, EPWM and Vc are low and power supply outputs are disabled.

When AC is disturbed for longer than the holdup time factor of the supply, an AC NOT OK indication is presented at input to comparator B causing EPWM to fall (conversely, if AC is disturbed for a shorter time such indication is not produced). As EPWM drops below the reference at the + input of comparator 33 (the voltage across Zd divided down by R6 and R7), output of comparator 33 rises, preventing conduction of Q1 and thereby pulling Vc to ground (disabling) level via resistor R11 and disabling the power supply outputs.

As Vc drops, the level presented at the + input to comparator C changes to a level determined by the reference voltage across Zd reduced by the drop relative to ground established in the divider formed by diode D2 and resistors R2 and R3. This input change causes output of comparator C, and therefore EPWM, to fall to a low level. EPWM and Vc then remain low until the voltage at the "−"input to comparator C drops below the level at the "+"input, due to discharge of capacitor C1 through R4. The delay time associated with this discharge, about 4 or 5 seconds with indicated component values, keeps EPWM (and therefor Vc) low for at least this delay time.

When the AC disturbance ends (input to comparator B returns to AC OK indication) or the voltage across C1 reaches the low reference level, whichever occurs later, comparator B or C operates to cause EPWM to rise. Since Vc follows, the power supply is effectively re-enabled either when the AC disturbance ends or at the end of the delay time associated with discharge of C1 ends, whichever is later.

When AC is disturbed for longer than the discharge delay time just noted, or the on/off switch is in on position after having been held off for longer than the discharge delay time, the "−"input to comparator C is lower than the divided down reference at the "+"input, and output of comparator C does not prevent EPWM from rising. Thus, when the disabling indication reverses (AC OK or switch ON indication re-established), EPWM is pulled instantly high through R8, causing Q1 to conduct and Vc to rise instantly, etc.

Figure 6:
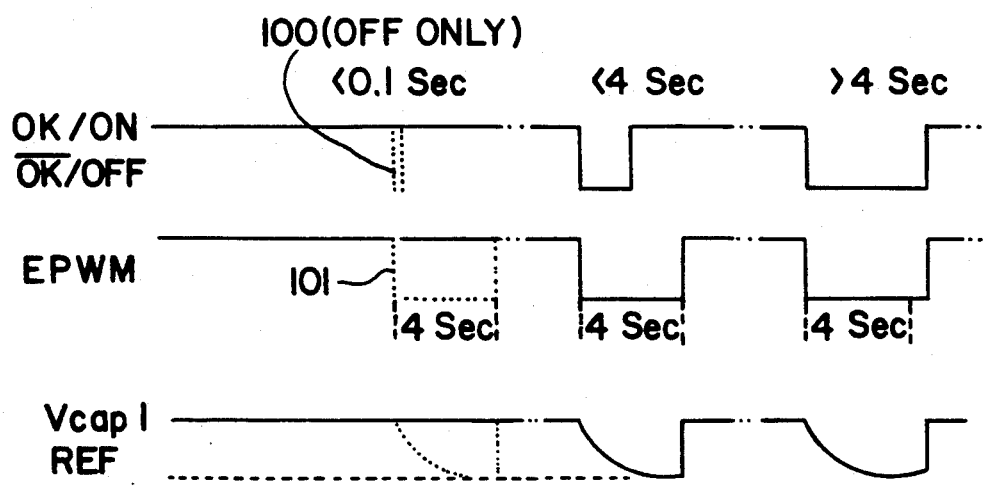
FIG. 6 illustrates operating characteristics of the circuits of FIG. 4 under various conditions of power outage and manual on/off switch operation.

Operations of the circuits of FIG. 4 under various time conditions of power disturbance and on/off switch operation are presented in FIG. 6. The first line in this figure is meant to indicate disturbances of either AC energy or power switch position for 3 different lengths of time; a duration less than the power supply holdup factor (i.e. <0.1 second), a duration greater than the holdup time but less than the nominal circuit delay (in this figure, shown as 4 seconds, although the delay of the circuits in FIG. 4 with illustrated components is closer to about 5 seconds), and a duration equal to or greater than 4 seconds. The other two lines indicate effects of these variations on EPWM and the level of voltage across capacitor C1 (Vcap1). In FIG. 6, variations in source AC energy and associated effects are shown by solid lines, and variations in switch position and associated effects, where different from AC conditions are shown by phantom/dashed lines.

The solid and phantom indications at 100 in FIG. 6 are meant to indicate that AC outage lasting less than 0.1 second does not affect the "AC OK" indication, due to the holdup characteristics of the supply previously discussed, but switch operations from on to off and back to on, completed in less than 0.1 second, do alter the state of the ON/OFF indication. The corresponding EPWM indications at 101 are meant to indicate that EPWM is unaffected by AC outage less than 0.1 second, whereas it is affected (reversed) during and following switch on to off to on operation in that time. Since EPWM does not change for AC outage less than 0.1 second, Vc does not change when such outages occur, and therefore such outages do not affect the power delivered to the system microprocessor and attachments. However, for switch operations from on to off and back on in less than 0.1 seconds, EPWM is driven low as suggested in phantom at 101 and then held low for the full delay time associated with discharge of capacitor C1 (in this figure, 4 seconds), that discharge timing indicated in phantom on the third line of FIG. 6.

For power interruptions of either kind lasting longer than 0.1 second but less than 4 seconds (AC outage or switch from on to off and back to on), corresponding control effects are timed by discharge of the voltage Vcap1 on capacitor C1. EPWM (and Vc) remain low for the full delay time associated with that discharge.

For interruptions of either kind lasting longer than 4 seconds, Vcap1 discharges in the usual time (4 seconds) but EPWM (and Vc) remain low for the full time of the disabling indication and then rise instantly to their high levels (without delay other than the relatively short delays associated with transitional operations of comparators 30–33 and Q1). Since Vc remains low C1 is prevented from charging and Vcap1 remains low for the full disturbance time.

When the power supply is recycled after being off more than 6 seconds, VI may initially be at ground or a very low voltage level, and therefore operations of the circuits of FIG. 4 may be delayed additionally for the time required by the supply to bring VI to a level suitable for operating these circuits. In general this power up delay is very short in relation to the delay associated with discharge of capacitor C1.

FIG. 5 illustrates a second preferred embodiment of the present invention. As in the embodiment of FIG. 4, the delay circuit shown in FIG. 5 contains four hysteresis comparator circuits, 70 through 73, each with internal hysteresis compensation as is well known in the art. As in FIG. 4, the circuits in FIG. 5, including the comparators 70–73, are powered by low DC bias voltages generated internally by the power supply. Comparators 70 and 73 are operated as inverting comparators, and comparators 71 and 72 are non-inverting. Each comparator in FIG. 5 has a controlling or variable input shown in the figure and a not-shown reference input to which the controlling input is compared.

Inverting comparator 70 receives its controlling-/variable input from the juncture of resistor 75 and manual on-off switch 74. As illustrated, switch 74 is a "soft" type switch (i.e. not directly in the path of AC source energy) between resistor 75 and ground. In ON position, the switch enables transfer of DC voltages to the output ports of the power supply. The switch contact or its circuit equivalent is open in the switch OFF position and closed in the ON position. Thus, the input to comparator 70 is high (internal bias voltage) when the switch is open and low (ground potential) when it is closed.

Controlling input to (non-inverting) comparator 71 is taken from the divider formed by resistors 76 (Rs1 and Rs2) between ground and a DC signal representing the state of source AC energy. The latter signal is generated internally in the power supply from source AC through conventional rectification and filtering. Thus, the average level of voltage input to this comparator is high when source AC is stable and low during outages of source AC.

Outputs of comparators 70 and 71 are tied to the input of inverting comparator 73 and therefore states of comparators 70 and 71 operate in coincidence to affect input states of comparator 73. Outputs of comparator 73 discussed later are voltages performing control functions which in aggregate correspond to those performed by signal Vc in FIG. 4; i.e. controlling operations of internal power supply elements which provide DC operating voltages to the system microprocessor and attachments.

Comparator 72 senses voltage across capacitor 78 (also designated delay capacitor 2). When the supply is active and in stable condition, capacitor 78 is fully charged, and +5 volts DC is coupled to the input of comparator 72 through diode 77. When internal power is disabled, the bias level at the input to diode 77 drops, and capacitor 78 discharges slowly through resistor Rd over a delay period of about 3 to 6 seconds (nominally 4 seconds in following discussions). Thus, input to comparator 72 is high when the power supply is operating normally and low when the supply has been disabled for a time sufficient to discharge delay capacitor 2 (nominally 4 seconds).

Output of comparator 72 is coupled to internal bias voltage through resistors 79 and 80, and follows the input. Thus, output of comparator 72 is high when the input is high and low when the input is low. The comparator output is coupled via resistor 80 to the base of "fast charging" transistor 81 ("Qfast"). Base of Qfast is coupled directly to internal bias voltage. Thus, when delay capacitor 2 is discharged (input and output of comparator 72 low), base of Qfast is pulled lower than the emitter, so that Qfast provides a low impedance charging path between bias voltage and capacitor 83 (delay capacitor 1) through resistor 82.

Resistor 82 provides a fast charging path to capacitor 83 (delay capacitor 1) when the charging node 84 of that capacitor is not being held low by outputs of comparators 70 and 71 (i.e. when switch 74 is ON and AC is stable). When input to comparator 72 is high, Qfast does not conduct and capacitor 83 charges at a trickle rate through resistor Rslow which presents resistance much greater than that of Rfast.

Output of comparator 73 is buffered through transistors 85–87 (Q1–Q3). As noted above, outputs of these transistors collectively perform functions equivalent to those associated with voltage Vc in FIG. 4. When input to comparator 73 is high (capacitor 83 fully charged), the comparator output is low, biasing bases of transistors Q1–Q3 off and thereby rendering respective transistors non-conductive. Collectors of these transistors are coupled to high bias voltages through not-shown resistors. Consequently, when these transistors are non-conductive their collector outputs are high or enabling relative to respectively indicated power supply control functions. Conversely, if delay capacitor 1 is not fully charged, input to comparator 73 is low and output of the comparator is high; so that Q1–Q3 conduct pulling respective collectors to low/ground levels which represent disabling levels relative to the system and attachments.

Figure 7:
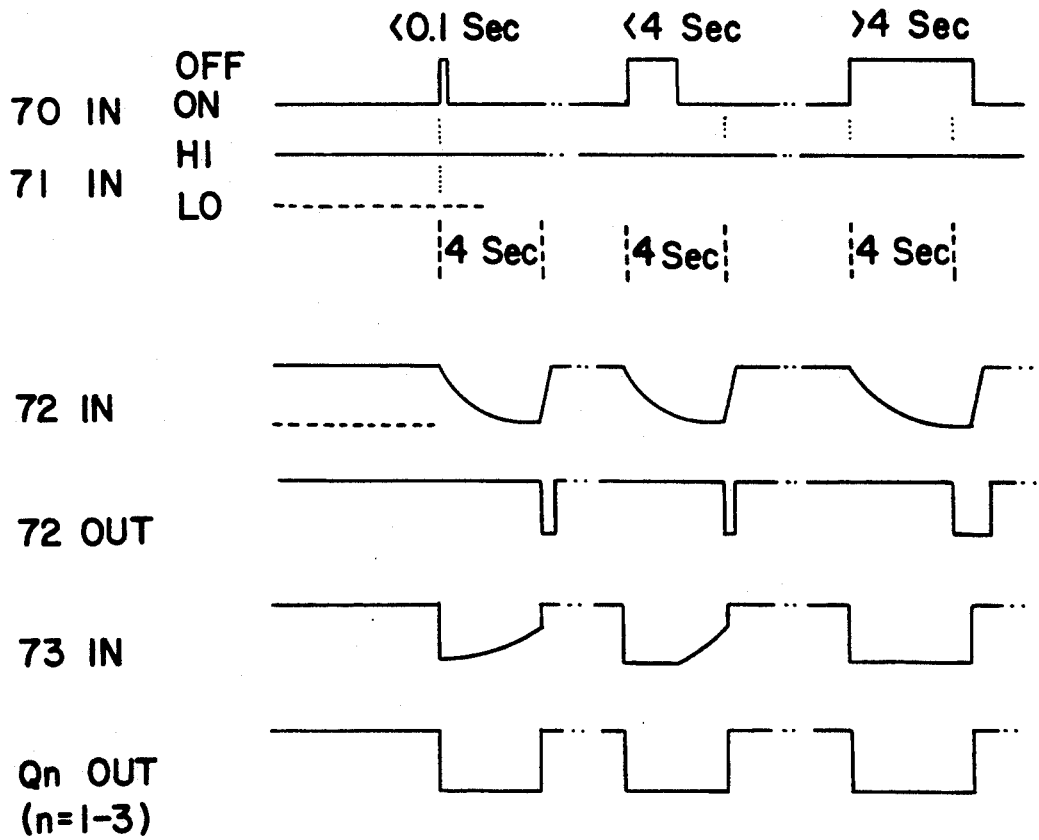
FIG. 7 illustrates operating characteristics of the circuits of FIG. 5 in response to variously timed operations of the manual on/off switch shown in FIG. 5.
Figure 8:
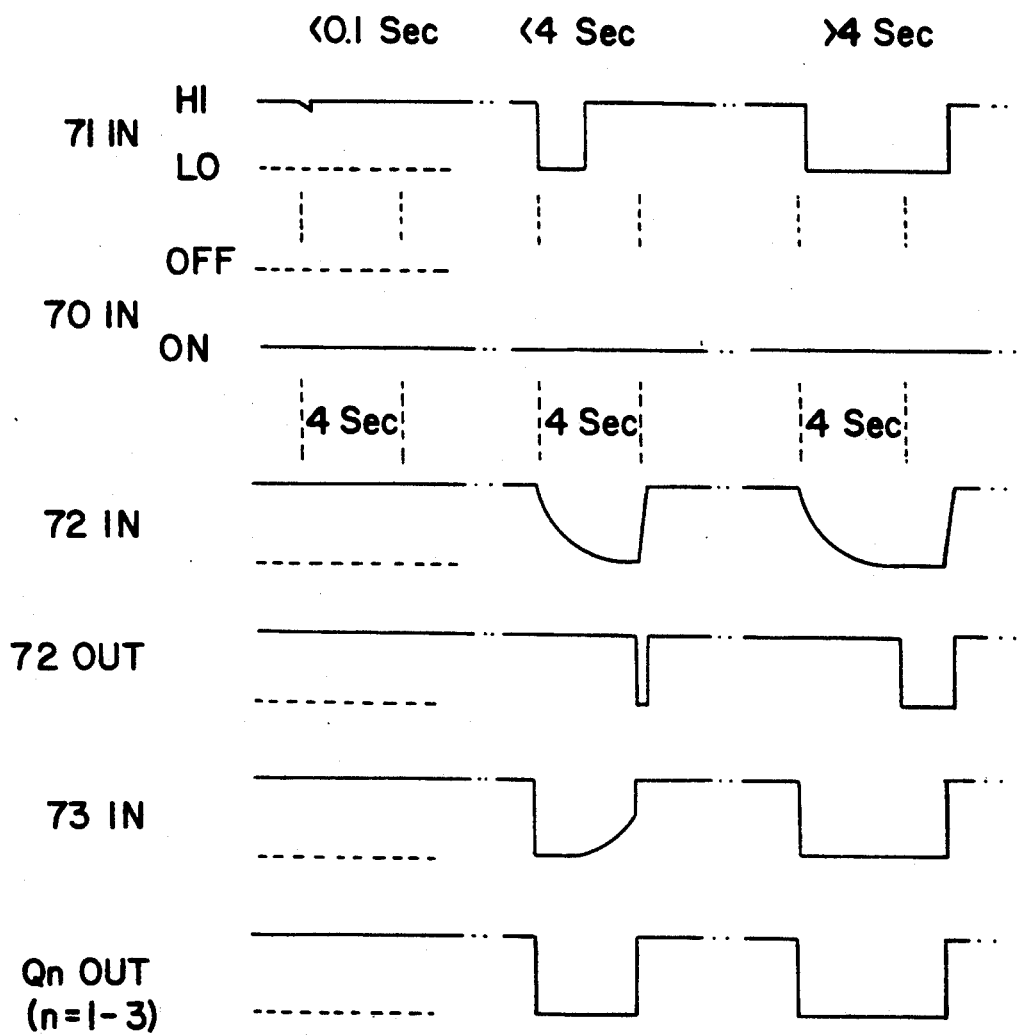
FIG. 8 illustrates operating characteristics of the same circuits in response to variously timed AC outage conditions.

What follows now is a description with respect to FIGS. 7 and 8 of the operations of the circuits of FIG. 5 under the following conditions: (1) AC stable, switch 74 operated from ON to OFF for less than 0.1 second; (2) AC stable, switch 74 transiently OFF for longer than 0.1 second but less than 4 seconds; (3) AC stable, switch 74 OFF longer than 4 seconds; (4) switch 74 ON continuously, source AC out for less than 0.1 second; (5) switch 74 ON continuously, source AC out longer than 0.1 second but less than 4 seconds; (6) switch 74 ON continuously, source AC out longer than 4 seconds. FIG. 7 illustrates circuit states when the switch is turned OFF for the various time periods just mentioned, and FIG. 8 illustrates circuit states when source AC energy is out for those periods.

1) AC stable, switch 74 transiently turned off for less than 0.1 second. Input to comparator 70 (70 IN) is high while the switch is off and low otherwise. While the switch state is varied, average level of source AC energy (71 IN) is assumed to remain constantly high or stable. Operation of the switch to OFF causes capacitors 83 and 78 to discharge. Capacitor 83 discharges rapidly while comparator 70 input is high (i.e. output is low). Capacitor 78 begins discharging (through resistor Rd) as the +5 volt output drops, and continues discharging (slowly, over the nominal 4 second delay interval) until the voltage across the capacitor is lower than the input reference voltage of comparator 72. At this time, output of comparator 72 goes low (see 72 OUT) allowing Qfast to conduct momentarily (since 70 IN is then low and thus not preventing Qfast conduction). The brief conduction of Qfast quickly completes the recharging of capacitor 83 as suggested at 73 IN (up to that point, the capacitor recharges slowly through Rslow), and that completes restoration of power supply system outputs to required positive levels, as suggested at Qn OUT.

2) AC stable, switch 74 transiently OFF longer than 0.1 second but less than 4 seconds. In this circumstance, variations in circuit states (of comparators 70, 72 and 73) are identical to the those indicated for switch OFF operations less than 0.1 second, and power supply system outputs are held off for the full nominal delay period of 4 seconds associated with the discharge time of capacitor 78.

3) AC stable, switch 74 OFF longer than 4 seconds. Capacitor 78 discharges sufficiently after 4 seconds to enable the fast charge path to capacitor 83 (see 72 IN and 72 OUT), but capacitor 83 is prevented from charging through that path by the low output of (high input to) comparator 70.

4) Switch 74 ON continuously, source AC out for less than 0.1 second. Referring to FIG. 8, 71 IN (representing average AC source energy input to the supply) is slightly disturbed, but not sufficiently to produce any changes at the output of comparator 72. Therefore, control signals Qn OUT and related power supply outputs to the system are unaffected.

5) Switch 74 ON continuously, source AC out for less than 4 seconds but more than 0.1 second. 71 IN (FIG. 8) falls to low limit, discharging capacitor 83 and thereby disabling power supply outputs through comparator 73 and Qn. This allows capacitor 78 to discharge (72 IN, FIG. 8). At the end of the 4 second nominal delay period associated with that discharge, 72 OUT falls momentarily allowing capacitor 83 to quickly recharge to the level permitting restoration of Qn OUT to stable positive levels associated with normal supply outputs to the system.

6) Switch 74 ON continuously, source AC out more than 4 seconds. 71 IN remains low for the full disturbance time. 72 IN and 72 OUT reflect discharge of capacitor 78, but capacitor 83 (73 IN) remains discharged because of the low input to comparator 71 which persists until the outage ends.

Comparing FIGS. 4 and 5, it should be appreciated that both circuits use four functionally equivalent comparators, and that capacitor C1 in FIG. 4 and capacitor 78 in FIG. 5 perform identical delay timing functions. In FIG. 5, capacitor 83 and its charging circuits effectively isolate the control node 84 from effects of noise in the internal bias voltage sources which charge that node and energize the comparators coupled to that node. Although there is no precise functional equivalent of this in the circuits of FIG. 4, the restricted amplitudes of control and reference inputs to comparator/buffer 33 in FIG. 4—the functional equivalent of comparator 73 in FIG. 5—provide a measure of noise immunity relative to control output Vc in FIG. 4, at least in relation to noise appearing at 34 (the source of internal bias voltage VI).

We claim:

1. A lockout prevention circuit for controlling transfer of DC supply voltage from the power supply of a microcomputer system having at least one power-dependent attachment to said system and comprising:
   circuit means powered by a first DC voltage received from said power supply for producing a second DC voltage for operating said microcomputer system and at least one of its attachments;
   said circuit means being responsive to a third DC voltage received from said power supply for conditionally inhibiting production of said second DC voltage for a predetermined delay time sufficient to prevent lockouts between said system and attachments; said third DC voltage indicating the condition of AC power received by said supply and said production of said second DC voltage being inhibited for said predetermined delay time when said third voltage indicates an AC disturbance lasting for less than said predetermined delay time.

2. A lockout prevention circuit for controlling transfer of DC supply voltage from a power supply to a microcomputer system having at least one power-dependent attachment comprising:
   circuit means powered by a first DC voltage received from said power supply for producing a second DC voltage for operating said microcomputer system and at least one of its attachments;
   said circuit means being responsive to a third DC voltage received from said power supply for conditionally inhibiting production of said second DC voltage for a predetermined delay time sufficient to prevent lockouts between said system and attachments; said third DC voltage indicating the condition of AC power received by said supply and said production of said second DC voltage being inhibited for said predetermined delay time when said third voltage reflects an AC disturbance lasting for less than said predetermined delay time; said circuit means including:
   first circuit means powered by said first DC voltage for conditionally producing said second DC voltage;
   second circuit means powered by said first DC voltage and responsive to said third DC voltage for indicating AC disturbances; and
   third circuit means responsive to operation of said second circuit means for inhibiting operation of said first circuit means for at least said predetermined delay time, and thereby delaying production of said second DC voltage and the consequent powering of said system and attachments for at least said predetermined delay time.

3. A lockout prevention circuit in accordance with claim 2 wherein said third DC voltage is constant when AC power to said supply is undisturbed, and undergoes a change in voltage level detectable by said third circuit means only when said AC power is disturbed for longer than a predetermined holdup time characteristic of the design of the respective supply, where said holdup time is much shorter than said delay time but longer than the duration of several AC cycles; whereby said inhibiting operation of said third circuit means is not evoked relative to very brief AC disturbances which do not significantly affect operation of said power supply; and
   said third circuit means is responsive to changes in said third DC voltage for effectively distinguishing between disturbances longer than said holdup time but shorter than said predetermined delay time and disturbances longer than said predetermined delay time, and for inhibiting operation of said first circuit means during each distinguished disturbance for at least the duration of the respective disturbance, and for an additional time corresponding to said delay time when said disturbance duration is shorter than said delay time.

4. A lockout prevention circuit in accordance with claim 3 wherein said third circuit means includes means further responsive to a DC voltage indication unrelated to the condition of AC power for further conditioning the inhibiting and reenablement of operations of said first circuit means.

5. A lockout prevention circuit in accordance with claim 4 wherein said power supply includes a manually operable power on-off switch and an internal DC voltage indication representing the state of operation of said switch, and said mean responsive to said unrelated condition is responsive to said internal switch indication for said further conditioning of disablement and reenablement of said first circuit means.

6. A lockout prevention circuit for incorporation in the power supply of a microcomputer system having at least one power-dependent attachment, said supply converting source AC energy into DC voltage for energizing said system, said lockout prevention circuit comprising:
- a first comparator circuit powered by DC voltages generated by said supply for detecting DC voltage indications indicative of disturbances in said source AC energy capable of adversely affecting DC outputs of said supply relative to said system;
- a resistor-capacitor timing circuit charged by DC voltage generated by said supply;
- a second comparator circuit for detecting the voltage charge on the capacitor in said resistor-capacitor timing circuit;
- a third comparator circuit for controlling DC outputs of said supply relative to said system;
- means coupled between outputs of said first and second comparator circuits and a controlling input of said third comparator circuit for conditioning said third comparator circuit to control transfer of DC operating voltages from said supply to said system only when said capacitor is charged to at least a predetermined voltage and coincidentally the input to said first comparator circuit is indicative of a level of AC source energy suitable for normal operation of said supply; and
- means coupled to said timing circuit for causing said capacitor to discharge over a predetermined delay time when said AC source energy is disturbed for more than a short predetermined time much less than said delay time; said delay time being sufficient to ensure that all elements of the system will be reset when the system is re-energized after a said AC disturbance.

7. A lockout prevention circuit for controlling transfer of DC operating voltages from a power supply to a microcomputer system comprising:
- a resistor capacitor timing circuit charged by a DC bias voltage generated by said power supply; said circuit having a predetermined timing delay when discharging;
- first, second, and third comparator circuits individually powered by DC bias voltages generated by said power supply and individually operating to compare DC voltages representing variable conditions of operation in said supply with reference DC bias voltages;
- said first comparator circuit detecting outages of AC source energy by comparing a DC voltage indicative of the level of said source energy with a reference DC voltage provided by said supply;
- said second comparator circuit detecting changes in states of operation of a manual ON/OFF switch coupled to said power supply by comparing a DC voltage indicative of the ON/OFF position of said switch with a reference DC voltage provided by said supply;
- said third comparator circuit detecting the level of charge currently stored in said timing circuit by comparing a DC voltage developed in said timing circuit with a reference DC voltage provided by said supply;
- a fourth comparator circuit having outputs controlling operations of said supply;
- means coupling outputs of said first, second and third comparator circuit in common to an in input of said fourth comparator circuit; whereby said fourth comparator circuit is conditioned to provide enabling outputs to said supply only when, coincidentally, the level of said source AC energy is above a predetermined energy level and said switch is in its ON position and said timing circuit is charged to a predetermined level of charge; and
- means coupled to said timing circuit for causing said circuit to discharge below said predetermined level of charge, over said predetermined delay time, when either said AC energy drops below said predetermined level as determined by said first comparator circuit or said switch is placed in its OFF position as determined by said second comparator circuit; said discharge causing said third comparator circuit to prevent restoration of said fourth comparator circuit to an enabling condition, by actions of either said first or second comparator circuit for at least said predetermined delay time; said predetermined delay time being sufficient to ensure that all devices attached to said microcomputer system and deriving DC power from said supply will be reset when power is restored and thereby being sufficient to preclude lockout of said system.

8. A lockout prevention circuit in accordance with claim 7 wherein said means causing said timing circuit to discharge is coupled to the output of said fourth comparator circuit, and thereby operates to begin said discharge when either said first or second comparator circuit undergoes a change in output indicating respectively AC outage or switch operation from ON to OFF.

9. A lockout prevention circuit in accordance with claim 7 wherein said means causing said timing circuit to discharge is operative to initiate said discharge when a bias voltage in said supply falls due to operation of said four comparator circuit.

10. A lockout prevention circuit in accordance with claim 9 including:
- a second resistor capacitor timing circuit coupled to the output of said third comparator circuit for effectively isolating said fourth comparator circuit from effects of noise in said DC voltages produced by said supply which power said first, second and third comparator circuits.

11. A lockout prevention circuit in accordance with claim 8 wherein said second timing circuit includes distinctly separate fast and slow charging paths for developing capacitively stored voltage affecting the input of said fourth comparator circuit; said fast path being enabled when said third comparator circuit senses discharge of said first-mentioned timing circuit below said predetermined time level and at the same time said first and second comparator circuits are in conditions associated with normal source AC energy and ON status of said switch.

* * * * *